United States Patent [19]

McDaniel

[11] Patent Number: 5,190,337
[45] Date of Patent: Mar. 2, 1993

[54] COLLAPSIBLE PIPE RACK FOR PICKUP TRUCKS

[75] Inventor: Patrick K. McDaniel, Pasco, Wash.

[73] Assignee: Columbia Mfg., Inc., Richland, Wash.

[21] Appl. No.: 765,153

[22] Filed: Sep. 24, 1991

[51] Int. Cl.⁵ .............................................. B60P 3/00
[52] U.S. Cl. ................... 296/3; 224/42.45 R
[58] Field of Search ...................... 296/3, 7, 8; 224/42.45 R; 211/195; 16/234, 388

[56] References Cited

U.S. PATENT DOCUMENTS

| | | | |
|---|---|---|---|
| 1,092,926 | 4/1914 | Madsen | 16/388 |
| 1,184,129 | 5/1916 | Quinn | 296/8 |
| 2,947,566 | 8/1960 | Tower | 296/3 X |
| 3,765,713 | 10/1973 | Suitt | 296/3 |
| 3,891,262 | 6/1975 | Brunel | 296/3 |
| 4,057,281 | 11/1977 | Garrett | 296/3 |
| 4,095,838 | 6/1978 | Beeler | 160/327 X |
| 4,138,046 | 2/1979 | De Freze | 296/3 X |
| 4,211,448 | 7/1980 | Weston | 296/3 |
| 4,398,763 | 8/1983 | Louw | 296/3 |
| 4,444,427 | 4/1984 | Martin | 296/3 X |
| 4,659,131 | 4/1987 | Flournoy | 296/3 |
| 4,770,458 | 9/1988 | Burke et al. | 296/3 |

*Primary Examiner*—Dennis H. Pedder
*Attorney, Agent, or Firm*—Wells, St. John, Roberts, Gregory & Matkin

[57] ABSTRACT

A pickup truck rack includes upper rails of "H" shape cross section, a lower channel of which receives folding legs and braces within in a collapsed condition. An upper channel telescopically receives an over cab rack extension. In an alternative embodiment, the rack extension moves to a vertically stored position.

6 Claims, 8 Drawing Sheets

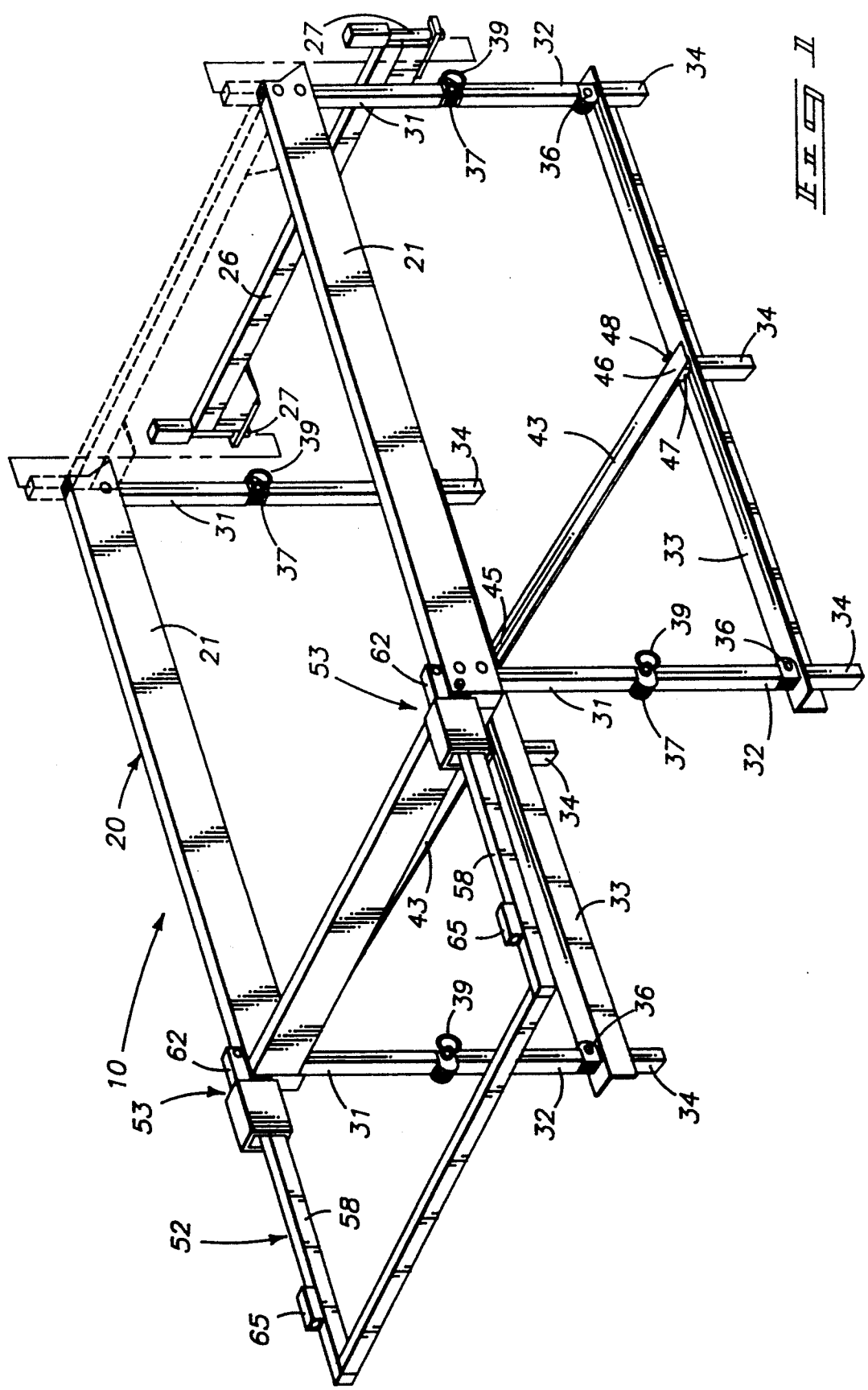

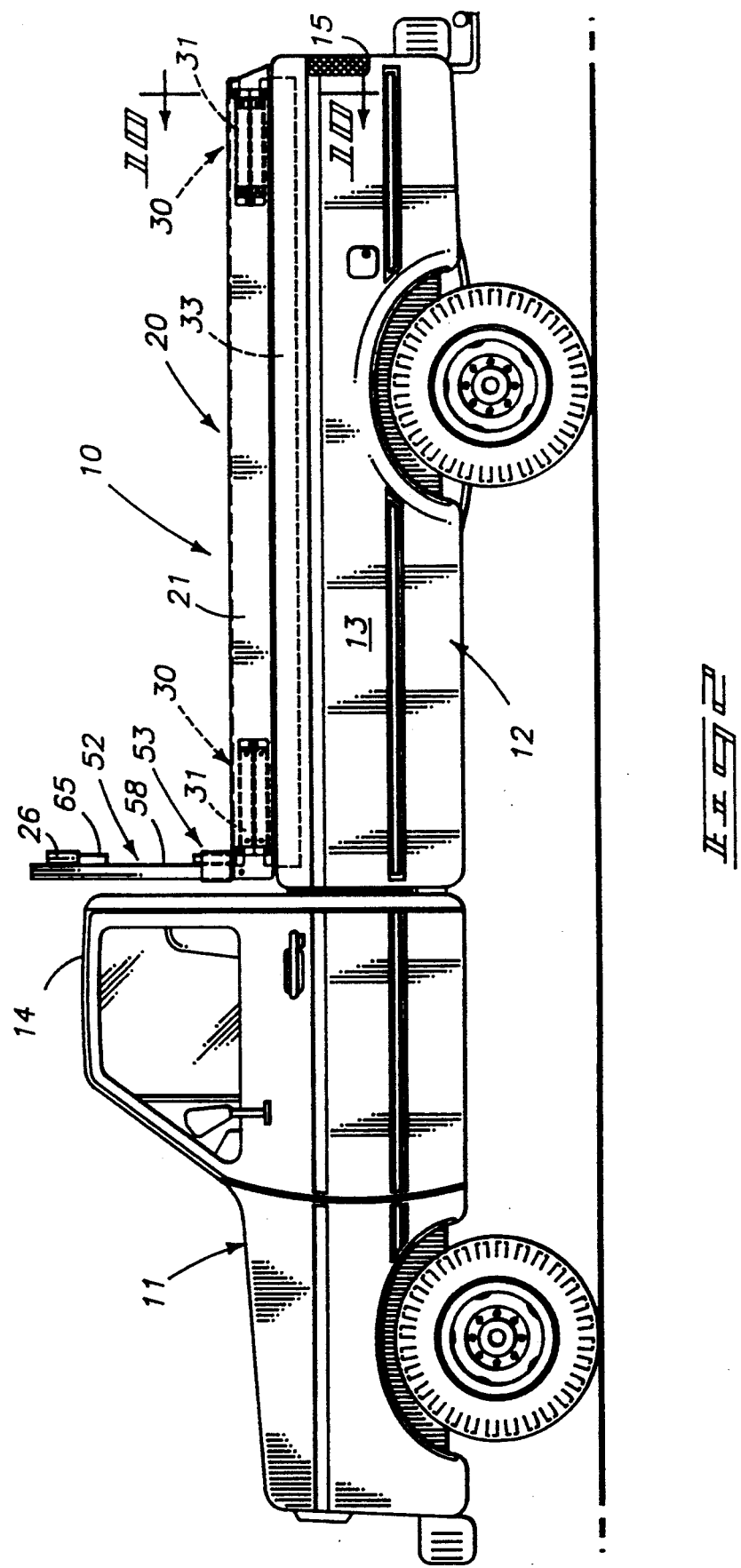

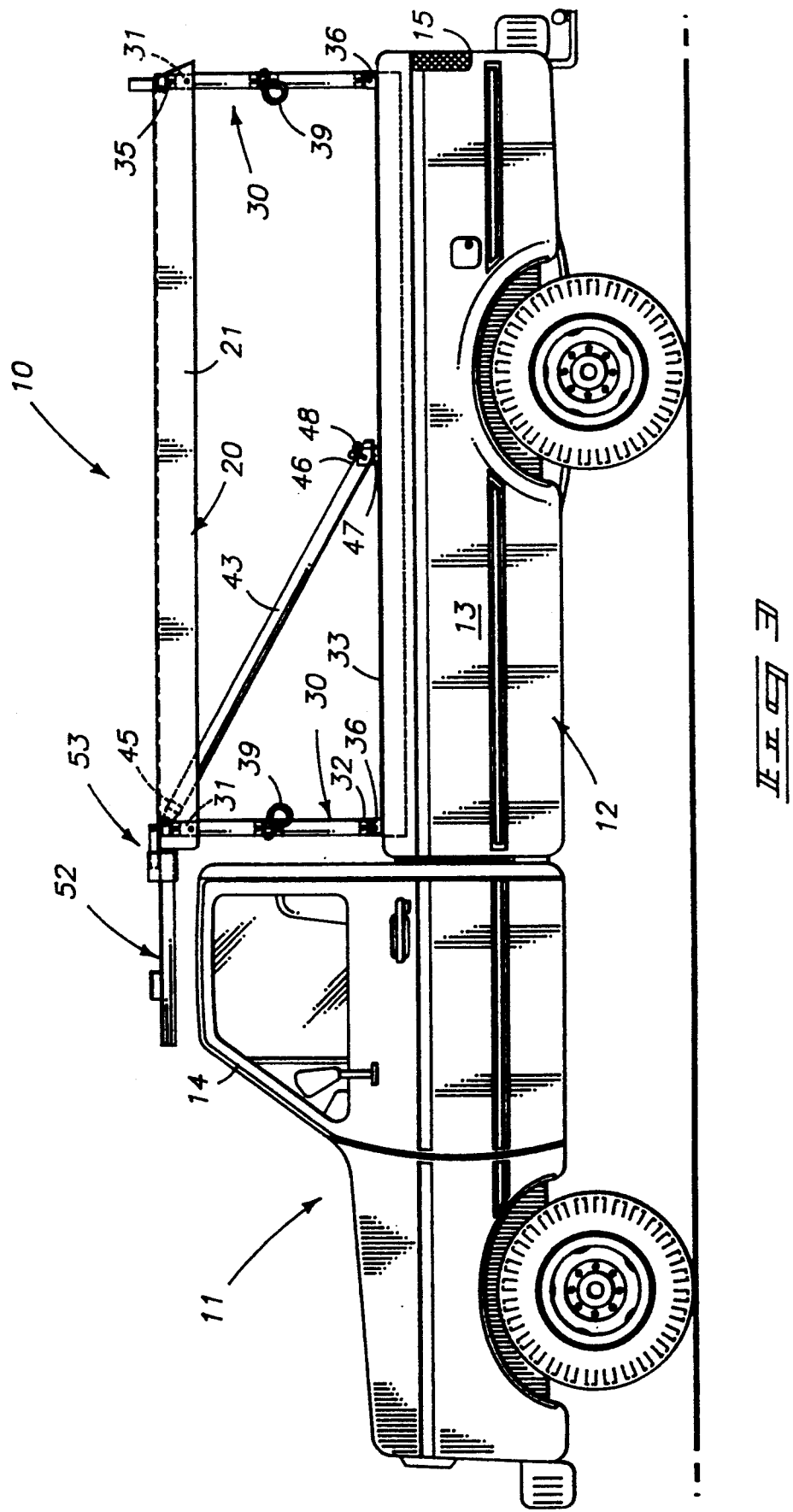

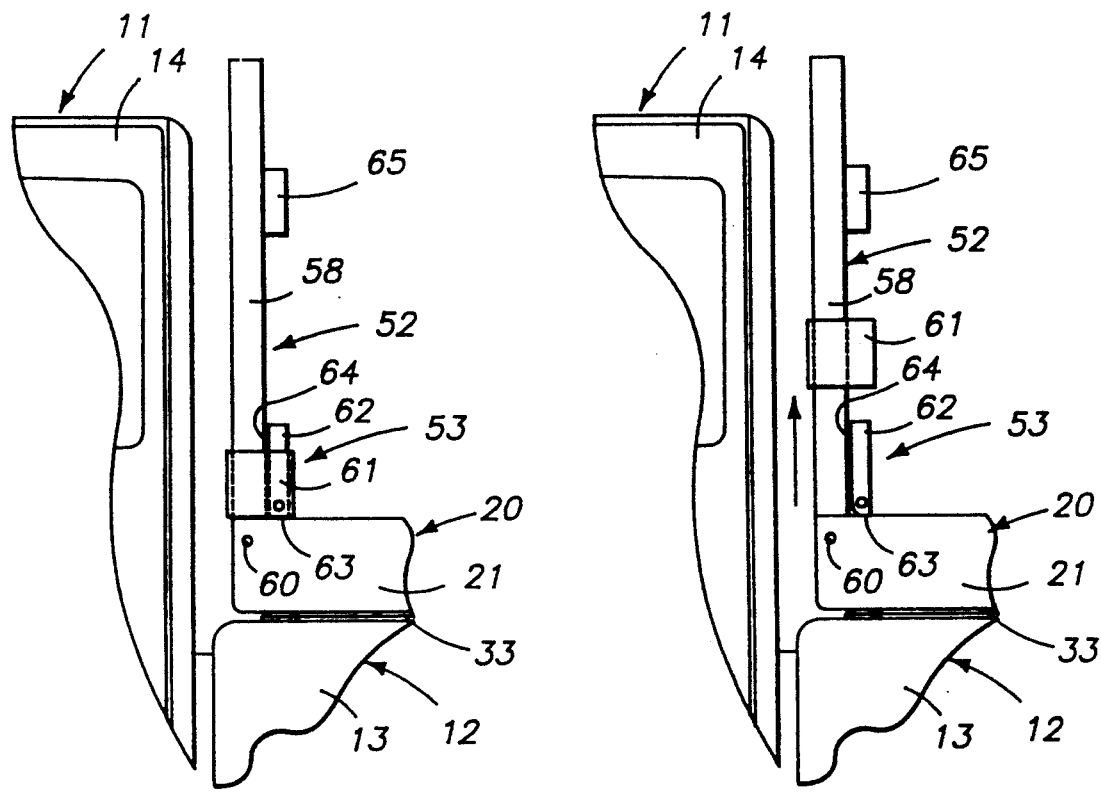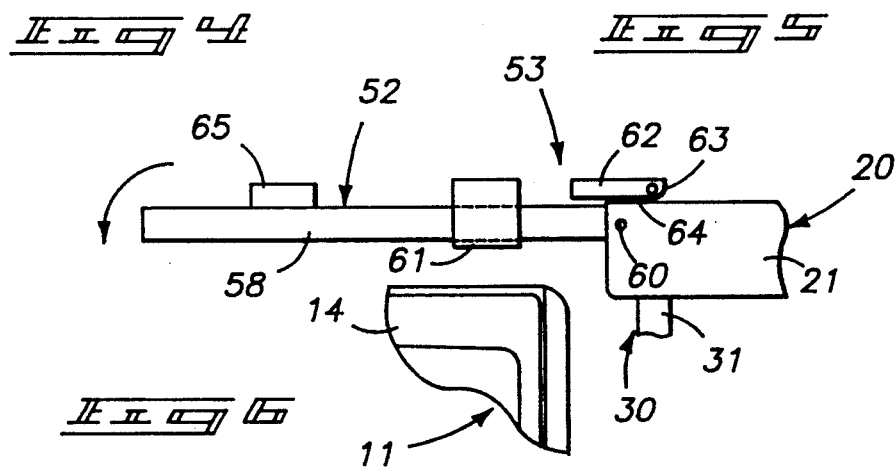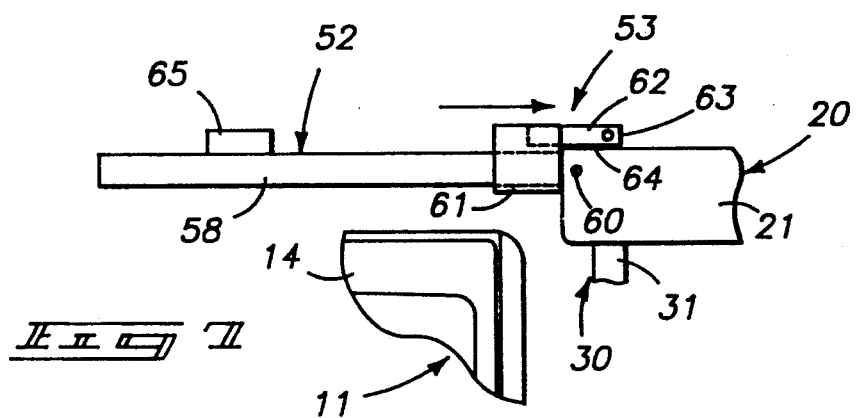

COLLAPSIBLE PIPE RACK FOR PICKUP TRUCKS

TECHNICAL FIELD

The present invention relates to racks for pickup trucks, and more particularly to such a rack that will fold between a downward, inoperative position, and an elevated operative position, and which includes an extension over the cab of the pickup truck.

BACKGROUND OF THE INVENTION

"Pipe racks" are often mounted to the beds of pickup trucks to carry long objects such as long sections of water pipe, lumber, and the like without having free ends of the load project long distances from the bed of a pickup truck. Typically, a pipe rack is formed of a welded or otherwise permanently joined pipe construction that is put together with a leg structure permanently supporting a rack frame at an elevation over the truck bed such that the frame projects forwardly over the truck cab.

Such frames have utility, but are not always needed and are unsightly and cumbersome when not in use. The frames increase the overall height of the pickup truck and thereby eliminate its use in certain confined areas, such as parking garages and other areas where the height dimension is designed more for standard pickup trucks and cars.

A need has therefore been realized for a rack arrangement that will fold between a compact, inoperative condition at a low elevation adjacent to the pickup bed, and an elevated, operative position with an extension projecting forwardly over the cab of the pickup. This need is fulfilled by the present invention which is disclosed in detail herein.

BRIEF DESCRIPTION OF THE DRAWINGS

First and second preferred forms of the present invention are exemplified in the accompanying drawings in which:

FIG. 1 is a perspective view of the present rack with a first preferred extension thereon;

FIG. 2 is a side view of the rack in an inoperative condition and mounted to the bed of a truck;

FIG. 3 is a view similar to FIG. 2 only showing the rack in an operative condition;

FIGS. 4-7 are sequential operational views showing adjustment of the first preferred extension;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 11:
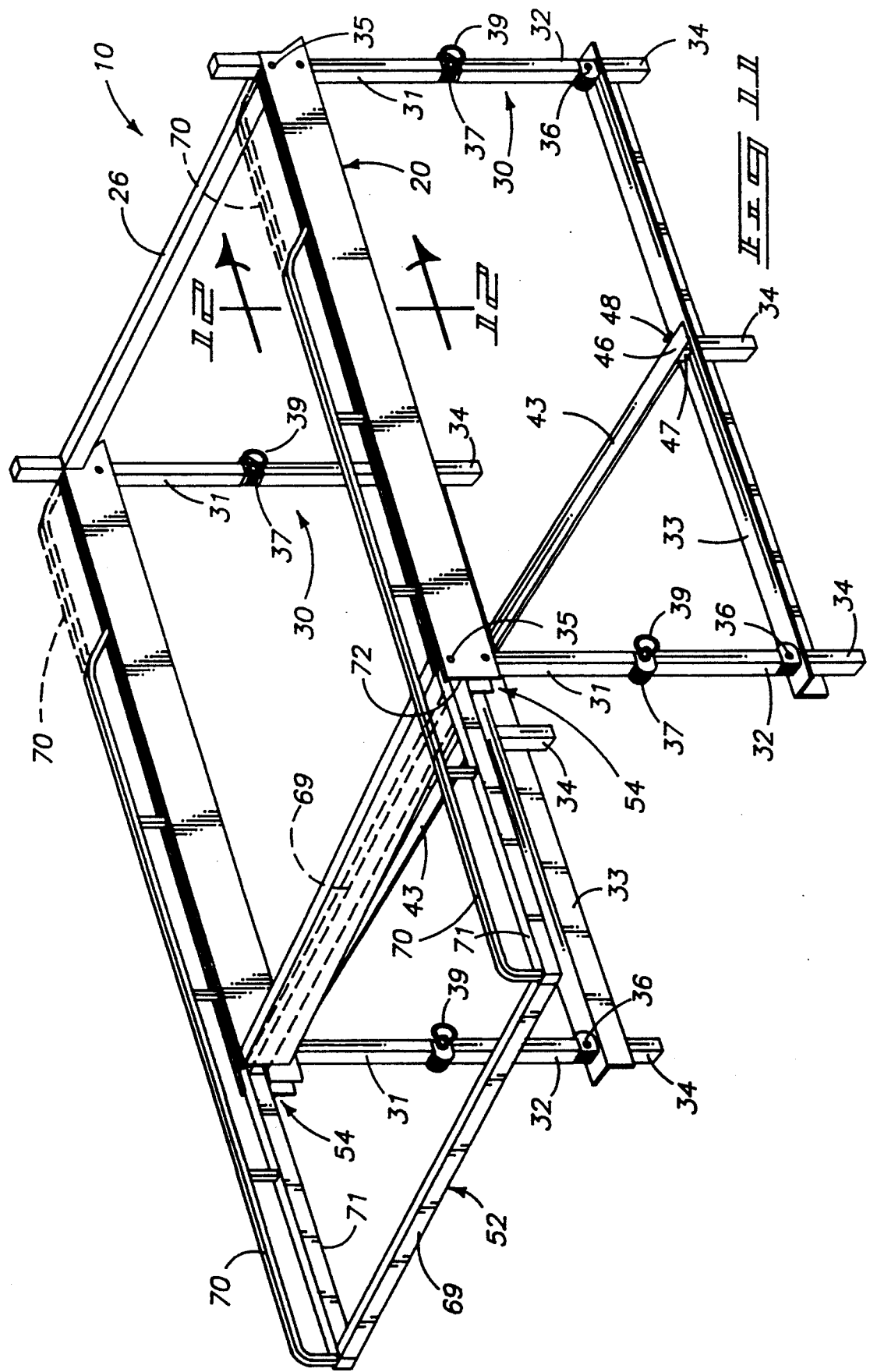
FIG. 11 is a perspective view of the present rack with a second preferred extension thereon.
Figure 12:
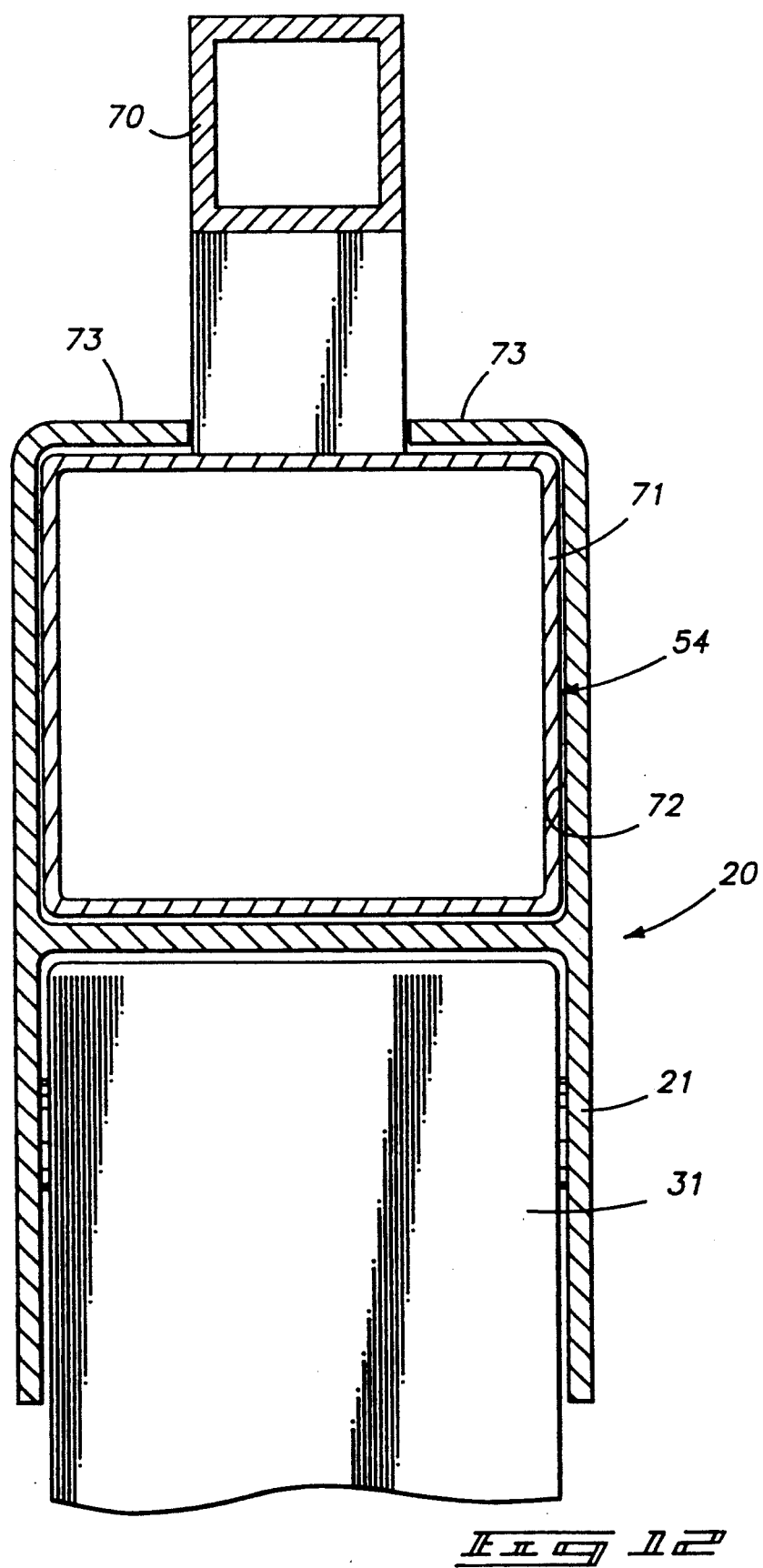
FIG. 12 is an enlarged sectional view taken substantially along line 12—12 in FIG. 11.

A collapsible rack is generally indicated by the reference numeral 10 in the accompanying drawings for attachment to a pickup 11. Two alternate versions of the preferred rack 10 are exemplified in the drawings. A first preferred version is illustrated at FIGS. 1-7 and a second preferred form is illustrated at FIGS. 11, 12.

The rack 10 is intended to be mounted on a pickup 11 such as shown in FIG. 2 which includes a rearwardly extending horizontal bed 12. The pickup bed 12 is typically rectangular, including upright elongated longitudinal sidewalls 13 extending from a forward cab 14 to a rearward end of the truck. A tailgate 15 extends transversely between the longitudinal sidewalls 13 at the rearward end of the truck.

The present rack 10 is mountable to the pickup bed 12 along the longitudinal upright sidewalls 13. Once mounted, the rack 10 may be shifted to an elevated, operative condition above the bed 12 as shown in FIG. 3, and be extended longitudinally over the cab 14. The rack 10 may also be shifted rest just upwardly adjacent the sidewalls 13 in an inoperative condition as shown in FIG. 2.

Referring in more detail to the drawings, it will be seen that the present rack includes a rigid rectangular rack frame 20. Rack frame 20 is shaped in its inoperative condition to compliment the perimeter of the truck bed 12, yet is extendable in the operative, elevated condition forwardly over the pickup cab.

Rack frame 20 includes elongated rigid side rails 21 that are positionable elevationally adjacent to the pickup sides 13. The side rails are formed of channel-shaped cross section 22 which, in the first preferred form (FIG. 10), is in the configuration of an inverted "U". In the second preferred embodiment (FIG. 12), the channel includes an added upwardly open channel section, making the cross section substantially "H" shaped, as will be discussed in greater detail below. The channels in both embodiments are preferably formed of rigid material, (as are the remainder of the structural components) such as anodized, extruded aluminum or other appropriate corrosion resistant material.

The side rails 21 of both embodiments are selectively joined across rearward ends thereof by a rearward cross member 26. Cross member 26 in a preferred form is releasably attached to the rearward ends of the side rails 21 by a latch assembly 27 (FIG. 1) at each cross member end. The latch assemblies 27 may be selectively released in order to facilitate removal of the cross member 26 to allow free access through the tailgate 15 to the pickup bed 12 when the rack frame is in the downward, horizontal inoperative position. The cross member 26 serves as an end support for a load when the rack frame is raised to the operative condition.

The rack frame 20 is movable between the inoperative position and an elevated operative position by provision of foldable legs 30. The drawings show four substantially identical legs 30, one at each corner of the rack frame 20.

Each leg 30 includes a first end 31 pivotally attached to the rack frame 20 and a second end 32 attached to a rack frame base plate 33. Two of the rack frame base plates 33 are provided along the longitudinal sides of the frame, to secure the rack 10 to the side walls 13 of the truck. To this end, the base plates 33 include stake pocket anchors 34 (FIGS. 1 and 11) to be received in the conventional stake pockets of the pickup bed 12.

Each leg 30 is pivoted at its second end 32 on a base clevis 36 (FIG. 10) to the adjacent rack frame base plate 33 for pivotal motion about a horizontal, transverse pivot axis. Each leg 30 is also pivoted at its first end 31 to the rack frame 20 along the adjacent side rail 21 about a pivot 35 (FIGS. 3, 11). Legs 30 are articulated at knuckle joints 37 substantially midway along their lengths.

In the preferred examples disclosed herein, the pivot axes at the leg ends 31, 32 and at knuckle joints 37 are parallel to one another and perpendicular to the longitudinal side walls of the truck, so the rack frame will move up and downwardly in the same substantially vertical plane as the sidewalls 13 of the truck.

Figure 8:
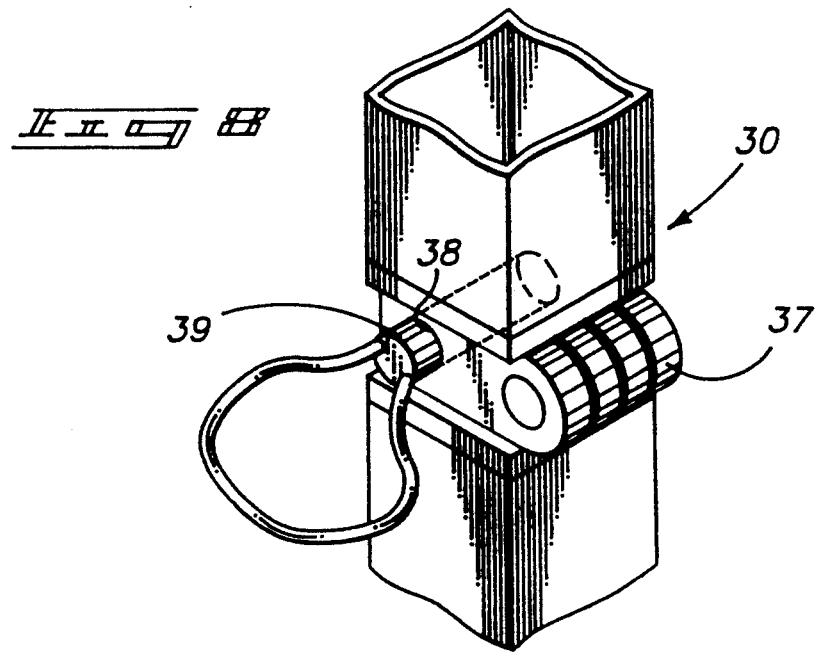
FIG. 8 is a fragmented detail view of a typical knuckle joint for the folding legs of the present rack in an operative, locked position.
Figure 9:
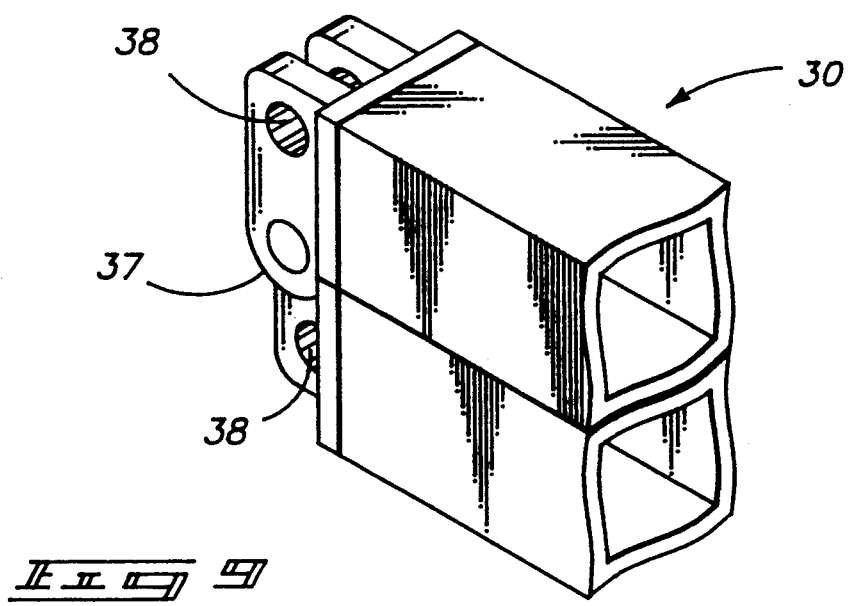
FIG. 9 is a fragmented detail view of the knuckle joint and associated leg folded to an inoperative position.

Knuckle joints 37 include lock apertures 38 (FIG. 9), formed in interlaced leaves of the joints, that align when the legs reach their upright, extended condition. The knuckles may be secured by lock pins 39 fitted through the apertures 38 to thereby lock the legs in their upright extended condition.

The same lock pins 39 are also utilized through anchor apertures 40 (FIG. 10) formed through the side rails 21 and each base clevis 36, to secure the rack selectively in the storage condition.

Figure 10:
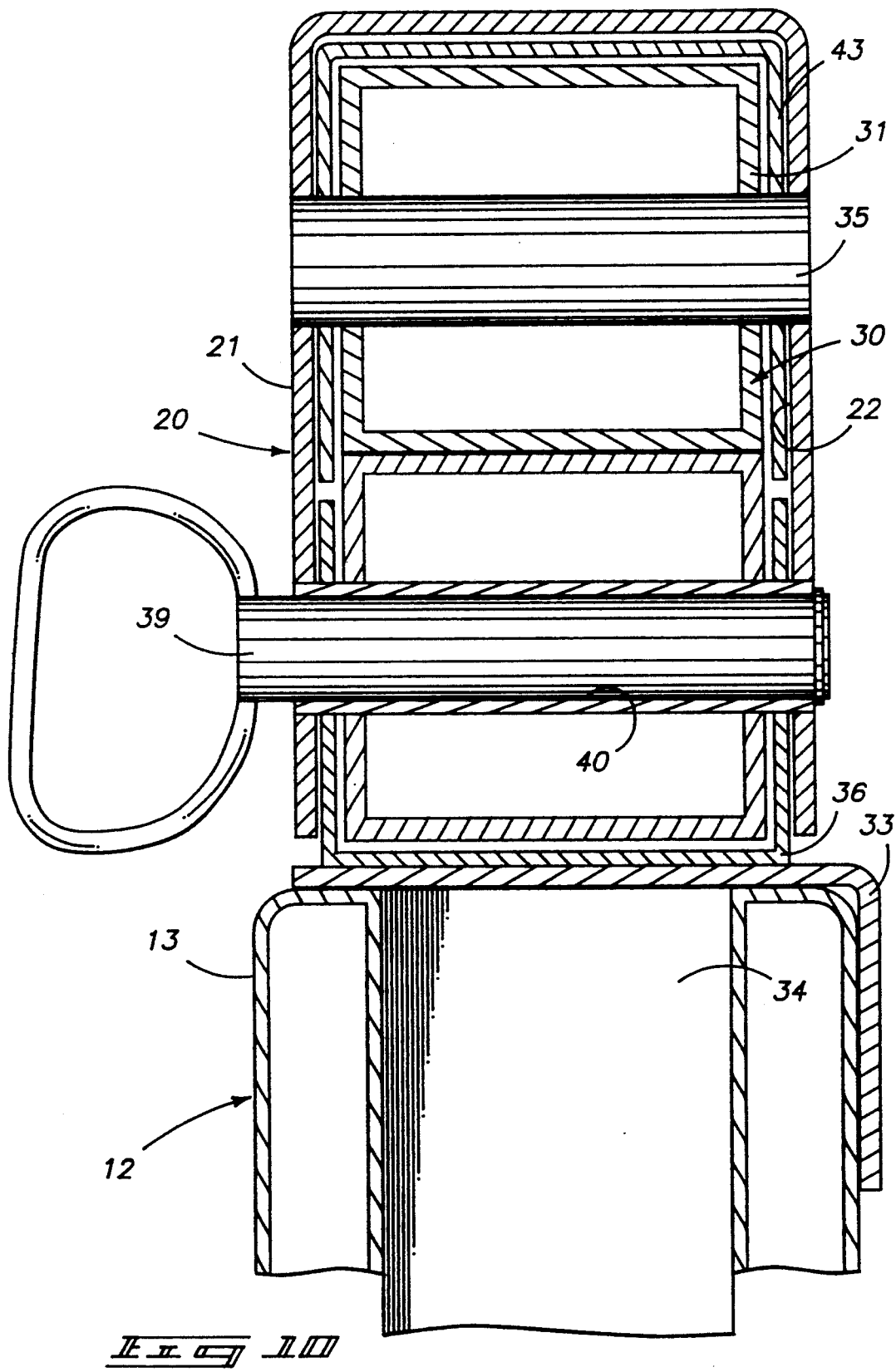
FIG. 10 is an enlarged sectional view taken substantially along line 10—10 in FIG. 2.

The knuckles 37 and the leg segments extending to opposite sides of the knuckles are uniquely arranged to fold inwardly onto one another and be received within the channels 22 of the side rails 21 (FIG. 10). Thus, when in the inoperative condition, the legs 30, knuckles 37, and pivots at the leg ends are visually hidden and protected from the elements by the side rails 21.

Each of the side rails 21 is advantageously provided with a brace 43. Each brace 43 is pivotably mounted at one end 45 (FIG. 3) to the adjacent rack frame side rail 21 within its channel 22. Each brace 43 also includes a free remaining end 46 that is releasably mountable to a stud 47 provided on the associated base plate 33. A wing bolt or nut 48 is supplied to selectively anchor the free remaining brace end 46 in this position in order to secure the rack in the elevated, operative condition.

The braces 43 pivot into the channels 22 in the inoperative condition of the rack 10 and so are also visually hidden and protected from the elements by the side rails 21 when the rack is in the inoperative condition.

The present collapsible rack 10 also includes a unique rack extension 52. Two preferred rack extensions 52 are exemplified herein.

As a first preferred example (FIGS. 2, 4, and 5), the rack extension 52 is shown mounted by a bracket assembly 53 for selective pivotal movement between (1) a first position wherein the extension is substantially upright (and may function as a rear window guard for the truck cab 14), and (2) a second position where the extension 52 is substantially horizontal and extends forwardly from the rack frame.

In the second preferred example (FIGS. 11, 12), the rack extension 52 is provided as a slide arrangement 54 that enables the rack extension 52 to slide horizontally between (1) a storage condition within the side rails 21 (dashed lines in FIG. 11) and (2) a horizontally extended operative condition (solid lines in FIG. 11) projecting forwardly of the side rails to project forwardly over the cab 14 of the associated pickup truck 11.

In the first preferred form, the rack extension 52 includes opposed side rails 58 that are substantially coincidental with the rack frame side rails 21. The extension side rails 58 are joined at forward ends by a forward end rail 59 (FIG. 1).

A journal 60 is provided at the rearward end of each side rail 58. The journals 60 join the side rails 58 to the rack frame side rails 21 for pivotal motion about a horizontal, transverse axis. The extension 52 pivots about this axis between the operative and storage conditions (see FIGS. 1, and 4–7).

A sliding sleeve locking member 61 is provided for selectively securing the rack extension 52 in either the first or the second position. The sleeve is slidably mounted to the side rails 58 to selectively engage the rails and pivoted lock posts 62 that are pivotably mounted to the forward ends of the side rails 21.

The lock posts 62 include abutment surfaces 63, 64, and will selectively pivot, when released from the sliding locking member 61, about horizontal pivot axes that are offset from the pivot axes of the journals 60. The abutment surfaces 63, 64 are positioned to limit pivotal motion of the posts 62 to an arc between the upright and horizontal conditions shown by FIGS. 5 and 6 respectively.

The posts 62 in their upright condition, receive the sliding locking members 61 which secure the side rails 58 to the posts 62. This secures the extension in the upright condition due to the locked, offset nature of the pivot axes for the extension side rails 58 and for the pivoted posts 62.

A similar condition is recognized with the extension side rails 58 in the horizontal position (FIG. 7). Here, the sliding locking members 61 have been moved to slidably engage the rails 58 and the pivoted posts 62, after the posts 62 have been pivoted to their horizontal orientations. The sliding sleeve locking members 61 therefore hold the rails 58 and pivoted posts 62 together, and the geometry of the separated pivot axes prevents further pivotal motion of the rack extension from the horizontal position.

Brackets 65 are provided on the extension side rails 58 to facilitate storage of the cross member 26 when not in use (FIG. 2). A similar bracket may also be provided on the second preferred form of the present rack extension, though not shown, at a convenient location thereon to provide similar storage capability for rearward cross member 26.

The rack extension 52 in the second preferred example (FIGS. 11, 12) includes an end rail 69 and side handrails 70. The handrails 70 are mounted to longitudinal base bars 71 that are slidably received within upper channels 72 (FIG. 12) of the rack frame side rails 21. The upper channels 72 also inwardly extending horizontal flanges 73 for elevationally securing the handrails 70 and base bars 71 in position.

The handrails 70 and base bars 71 form the side rails of the second preferred extension, and are joined by an end rail 69 at forward ends thereof. The end rail 69, handrails 70 and bars 71, may be selectively moved to the extended position shown in FIG. 11, or retracted to the then inoperative storage position shown by dashed lines therein. The amount or distance of the extension is limited only by the length of the handrails and bars 70, 71, and the length of the rack side rail upper side rail channels 72. Appropriate stop pins (not shown) may be provided to be fitted through apertures formed through the side rails and the extension to selectively lock the extension in its operative or inoperative condition.

Prior to operation, the present collapsible rack is installed on a pickup simply by attaching the base plates 33 to the pickup bed sides 13, and inserting the stake pocket anchors 34 into the appropriate stake pockets of the pickup bed. The present rack is then substantially secured to the pickup for use.

Once installed, operation of the present collapsible rack is easily accomplished. The rack may be easily and quickly shifted from the downward horizontal inoperative condition to the upward and extended operative condition. This is done firstly by removing the lock pins 39 from the side rails 21 and associated anchor apertures 40 (FIG. 10). The side rails 21 and legs 30 are thereby unlocked and are free to be lifted upwardly through a path of movement defined by the folding legs 30.

The legs 30, pivoted at their ends to the rails 21 and base plates 33, will allow the rack frame to be shifted translationally upwardly, directly over the pickup bed 12.

Once the legs 30 become fully extended, the user may reattach the lock pins 39 in the appropriate lock apertures 38 of the knuckle joints 37 to secure the rack in the upright orientation.

At this time, the user may also wish to secure the braces 43, which pivot down from the elevated rails 21, to be secured by the appropriate wing bolts 48 to the studs 47. This further secures the rack frame in its upward, operative orientation.

Next, the user may wish to selectively shift the rack extension 52 to the operative condition. This is accomplished using somewhat different procedures according to the first or the second embodiment.

In the first embodiment, the rack extension 52 may now be moved to the operative position simply by sliding the lock member sleeves 61 to positions disengaged from the upright pivoted posts 62 (FIG. 5). The extension can then be pivoted downwardly to the horizontal position (FIG. 6). The posts 62 are then similarly pivoted to horizontal positions.

Next, the sleeve locking members 61 are slid back over the now horizontal pivoted posts 62 (FIG. 7), securing the rack extension in the horizontal, operative position, extending out forwardly over the cab of the truck.

Movement to the inoperative position from the operative position described above is accomplished simply by substantially reversing the above described steps.

Shifting the rack extension of the second preferred embodiment from the inoperative to the operative position is accomplished simply by sliding the rack extension forwardly from the stored condition (dashed lines, FIG. 11) after the rack frame 20 has been elevated to its operative position above the pickup cab. Appropriate lock pins, set screws, or other locking devices (not shown) may be then secured to fix the extension in its forwardly extended operative condition.

If, in either form, the rear cross member 26 has not been previously utilized across the rearward ends of the rails 21, the rack may be completed by selectively positioning the rear cross member 26 in the appropriate receptacle ends of the side rails 21. This completes the assembly of the rack 10 in its operative orientation. The rack 10 is now accessible for use to carry long objects, such as long planks, pipes, etc. in a manner identical to that used with existing, rigid, rack frame structures.

In compliance with the statue, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A collapsible rack for a pickup truck having a horizontal cargo bed and a cab, comprising:
    a rack frame extending from a forward end to a rearward end and wherein the rack frame includes a pair of elongated rigid side rails, each having a cross sectional configuration in the approximate shape of the letter "H" with a top channel and a bottom channel;
    folding legs, each having a first end and a second end, with the first end including means for attachment to the rack frame within the bottom channel of one of said side rails and the second end with means for attachment to the pickup truck;
    knuckle means on the legs for enabling selective folding of the legs between storage conditions wherein the rack frame is located in a horizontal, lowered inoperative position adjacent the pickup bed, with the legs being received within and covered by the bottom channels of the side rails, and raised conditions wherein the frame is supported in an elevated, operative position with respect to the pickup bed; and
    a rack extension mounted to the top channels of the side rails; and
    wherein the rack extension is slidably received within the top channels of the side rails at the forward ends thereof for selective sliding adjustment therein between a first, storage position substantially retracted within the top channels, and a second, operative position, wherein the rack extension projects substantially horizontally and forwardly from the forward ends of the side rails.

2. A collapsible rack for pickup trucks as defined by claim 1, further comprising:
    a rearward cross member joining the rearward ends of the side rails.

3. A collapsible rack for pickup trucks as defined by claim 1, further comprising a brace member having opposed ends, with one end mounted to the rack frame.

4. A collapsible rack for pickup trucks as defined by claim 1, further comprising a brace member having opposed ends, with one end mounted to the rack frame and a remaining end with means for attachment to the pickup truck.

5. A collapsible rack for a pickup truck having a horizontal cargo bed and a cab, comprising:
    a rack frame including a pair of rigid elongated side rails each including a downwardly open elongated channel extending between forward and rearward ends;
    folding legs, each having a first end and a second end, with the first end pivotally attached to one of the side rails within the channel thereof and the second end having means for attachment to the pickup truck;
    knuckle joints on the legs for permitting folding thereof between storage conditions wherein each leg is received within and covered by one of said channels, with the rack frame located in a horizontal, lowered inoperative position adjacent the pickup bed, and raised conditions wherein the frame is supported in an elevated, operative position with respect to the pickup bed; and
    a rack extension pivotably mounted to the rigid elongated side rails adjacent the forward ends thereof for selective movement between an upright storage position projecting upwardly from the side rails and a substantially horizontal extended position, to to selectively extend from the rack frame over the pickup cab; and locking means on the rigid elongated side rails and rack extension for selectively locking the rack extension in either the upright storage position or the horizontal extended position.

6. A collapsible rack for a pickup truck having a horizontal cargo bed and a cab, comprising:

a rack frame including a pair of rigid elongated side rails each with an elongated open channel formed therein extending between forward and rearward ends;

folding legs, each having a first end and a second end, with the first end pivotally attached to one of the side rails within the open channel thereof and the second end with means for attachment to the pickup truck;

a brace member on each rigid elongated side rail, with a top brace member end pivotably mounted within the side rail channel and a lower end with means for attachment to the truck;

knuckle means on the legs for enabling folding of the legs and corresponding elevational movement of the elongated side rails between storage conditions with each leg received within and covered by one of said elongated channels, in which the side rails are located in a horizontal, lowered inoperative position adjacent the pickup bed, and raised conditions wherein the side rails are supported in an elevated, operative position with respect to the pickup bed;

wherein the brace members are each shaped to be received within one of the channels of the side rails when in the horizontal lowered inoperative position;

a rack extension; and means mounting the rack extension to the side rails for selective positioning between a first, storage position adjacent the forward ends of the side rails, and a second, operative position wherein the rack extension projects substantially horizontally forwardly from the forward ends of the side rails as an extension thereof to project over the pickup cab.

* * * * *